(12) United States Patent
Zhang

(10) Patent No.: US 10,880,180 B2
(45) Date of Patent: Dec. 29, 2020

(54) METHOD AND APPARATUS FOR DATA ANALYTICS MANAGEMENT

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 54 days.

(21) Appl. No.: 15/237,225

(22) Filed: Aug. 15, 2016

(65) Prior Publication Data

US 2017/0078157 A1 Mar. 16, 2017

Related U.S. Application Data

(60) Provisional application No. 62/219,497, filed on Sep. 16, 2015.

(51) Int. Cl.
| | |
|---|---|
| *H04L 12/24* | (2006.01) |
| *G06F 17/30* | (2006.01) |
| *H04L 12/26* | (2006.01) |
| *G06F 16/29* | (2019.01) |

(Continued)

(52) U.S. Cl.
CPC .............. *H04L 41/14* (2013.01); *G06F 16/29* (2019.01); *H04L 41/044* (2013.01); *H04L 41/5064* (2013.01); *H04W 4/70* (2018.02); *H04L 43/0876* (2013.01); *H04W 24/10* (2013.01)

(58) Field of Classification Search
CPC . H04L 41/14; H04L 41/5064; H04L 43/0876; G06F 17/30864
See application file for complete search history.

(56) References Cited

U.S. PATENT DOCUMENTS 9,588,815 B1 * 3/2017 Mistry ................. G06F 9/5077
2006/0242285 A1 10/2006 Moriwaki
(Continued)

FOREIGN PATENT DOCUMENTS

| CN | 102035678 A | 4/2011 |
|---|---|---|
| CN | 102447596 A | 5/2012 |

(Continued)

OTHER PUBLICATIONS

International Search Report for International Patent Application No. PCT/CN2016/097369 dated Nov. 25, 2016.
(Continued)

*Primary Examiner* — Nicholas R Taylor
*Assistant Examiner* — Sanjoy Roy

(57) ABSTRACT

An improved system and method for providing data analytics management (DAM), in particular for wireless networks having multiple domains, is disclosed. Some embodiments utilize a hierarchical DAM structure. Such a hierarchy includes a Global DAM function which provides inter network DAM, and domain DAM functions which provide intra network DAM. Some embodiments utilize a plurality of local DAM functions within a domain. In some embodiments, the global DAM can be implemented by a third party. In other embodiments, different networks inter operate by utilizing virtual network slices over non-owned infrastructure to provide what appears to be a global network by each operator. For such embodiments, DAM can be performed on a per slice basis.

29 Claims, 9 Drawing Sheets

(51) Int. Cl.
*H04W 4/70* (2018.01)
*H04W 24/10* (2009.01)

(56) References Cited

U.S. PATENT DOCUMENTS

| | | | | |
|---|---|---|---|---|
| 2009/0276771 | A1* | 11/2009 | Nickolov | G06F 9/4856 |
| | | | | 717/177 |
| 2012/0159422 | A1* | 6/2012 | McClamroch | G06F 11/3672 |
| | | | | 717/101 |
| 2012/0310423 | A1* | 12/2012 | Taft | G06Q 50/06 |
| | | | | 700/286 |
| 2013/0254749 | A1 | 9/2013 | Sivalingam et al. | |
| 2014/0047106 | A1* | 2/2014 | Leung | H04L 43/08 |
| | | | | 709/224 |
| 2014/0280338 | A1* | 9/2014 | Metz | H04L 41/0853 |
| | | | | 707/774 |
| 2014/0280361 | A1* | 9/2014 | Aliferis | G06F 17/30958 |
| | | | | 707/798 |
| 2014/0280909 | A1* | 9/2014 | Gosink | G06Q 10/06 |
| | | | | 709/224 |
| 2016/0197799 | A1* | 7/2016 | Clemm | H04L 43/06 |
| | | | | 709/202 |
| 2017/0164212 | A1* | 6/2017 | Opsenica | H04W 12/06 |
| 2017/0366428 | A1* | 12/2017 | Shaw | H04L 43/0811 |

FOREIGN PATENT DOCUMENTS

| | | |
|---|---|---|
| CN | 104253767 A | 12/2014 |
| EP | 1906590 A2 | 4/2008 |
| WO | 2011032595 A1 | 3/2011 |

OTHER PUBLICATIONS

GS NFV-MAN 001 V0.5.0 (May 2014), Network Function Virtualization (NFV), Management and Orchestration, Jun. 3, 2014.
Extended European Search Reported dated Mar. 28, 2018 for corresponding EP application No. 16845641.6 filed Aug. 30, 2016.

* cited by examiner

METHOD AND APPARATUS FOR DATA ANALYTICS MANAGEMENT

CROSS-REFERENCE TO RELATED APPLICATIONS

This application claims the benefit of priority to U.S. patent application Ser. No. 62/219,497, entitled "METHOD AND APPARATUS FOR DATA ANALYTICS MANAGEMENT" filed Sep. 16, 2015, which is hereby incorporated by reference in its entirety.

FIELD OF THE INVENTION

The present invention pertains to the field of data analytics management.

BACKGROUND

Wireless networks include a number of infrastructure elements. Such infrastructure elements include access points or base stations, for communicating with mobile devices, gateways, functional service nodes that offer services such as Authentication Authorization and Accounting as well as Policy and Charging Rule enforcement functions. A mobile device should be understood as a device that connects to a mobile network, and includes user equipment (UE) and other wireless devices. These different geographical transmission regions may be managed and operated by different wireless network service providers, each of which utilize a variety of infrastructure elements for providing communication services to devices.

Mobile Devices can include devices which communicate using the wireless infrastructure, but are not typically mobile. An example of such devices includes smart meters, which provide utility companies with usage information using machine type communication (MTC). There may be thousands of such MTC devices, all using the same service.

There is a need to collect and analyze data relating to the communication services provided to wireless devices. Conventionally this collecting and analyzing of data has involved the infrastructure elements logging (collecting) data and transmitting the logged data to requesters. However, the increasing number of devices being deployed and the increasing number or infrastructure elements to provide service to this increasing number of devices, coupled with the fact that networks may be operated and used by different entities, present challenges for collecting and analyzing this data. For example, with the increasing number of devices using wireless networks, significant network resources may be used for logging and reporting data potentially with overlapping data being transmitted to various parties. This can use up network resources which could be better used to provide network services to customers.

This background information is provided to reveal information believed by the applicant to be of possible relevance to the present invention. No admission is necessarily intended, nor should be construed, that any of the preceding information constitutes prior art against the present invention.

SUMMARY

Accordingly an object of embodiments of the present invention is to provide an improved system and method for providing data analytics management (DAM). Rather than having every infrastructure element log data and potentially transmit large amounts of data, at multiple times to different parties, embodiments provide a centralized service for collecting and providing data to satisfy different requests from different parties. Embodiments may be of particular use for wireless networks, and in particular for wireless networks having multiple domains. Some embodiments utilize a hierarchical DAM architecture. Such a hierarchy includes a Global DAM entity which provides inter network DAM, and domain DAM entities which provides intra network DAM. Some embodiments utilize a plurality of local DAM entities within a domain. In some embodiments, the global DAM can be implemented by a third party. In other embodiments, different networks inter operate by utilizing virtual network slices over non-owned infrastructure to provide what appears to be a global network by each operator. For such embodiments, DAM can be performed on a per slice basis.

In some embodiments, DAM entities are instantiated and/or configured on demand. In some embodiments, a local DAM entity can be instantiated/configured either by, or in response to instructions from, a domain DAM.

In some embodiments, there is provided a distributed DAM topology with a domain DAM entity consolidating data received from a plurality of local DAM entities, and providing results to requesters, which may come from a global DAM function. This can be used for data logging, network resource utilization, charging and other applications. Further, in some embodiments DAM entities can provide on-demand services to other network operation services and network customers, including virtual network operators, over-the-top (OTT) network customers (who typically operate their own networks for providing content to users) and enterprise customers.

Other aspects provide for processing systems which include a processor and machine readable memory storing software instructions which, when executed, cause said processor to carry out the methods disclosed herein, including instantiating and migrating the virtual entities which implement said methods.

An aspect of the present invention provides a method of providing data analytics information, the method executed by a first data analytics management (DAM) function. Such a method includes receiving a request for data analytics information from a requester. Such a method further includes configuring a plurality of DAM network functions to collect network data. Such a method further includes receiving the network data from the plurality of DAM network functions. Such a method further includes consolidating the network data to produce the requested data analytics information to satisfy the request. Such a method further includes supplying the requested data analytics information to the requester. In some embodiments configuring a plurality of DAM network functions comprises instantiating any DAM network functions which have not been previously instantiated and are needed to satisfy the request. In some embodiments receiving the network data includes retrieving the network data from a database populated by each of the plurality of DAM network functions. In some embodiments the first DAM function is a network domain function and each of the plurality of DAM network functions are local DAM functions instantiated to collect data from local network infrastructure elements. In some embodiments the local DAM functions are instantiated close to the local network infrastructure elements. In some embodiments the local DAM functions are instantiated within a node for collecting data from a cluster of network infrastructure elements. In some embodiments the location of the local DAM functions are dependent on the nature of the request. In some embodiments the local DAM functions supply different types of data, with the data being supplied being dependent on the request. In some embodiments the first DAM function is a global domain function and configuring a plurality of DAM network functions comprises configuring a plurality of domain network functions for providing DAM information on per domain basis, with each domain function configured to configure local DAM functions for collecting local DAM data from local network infrastructure elements. In some embodiments the requester is an infrastructure manager function. In some embodiments the requester is a Customer Service Management (CSM) function. In some embodiments the requester is a third party. In some embodiments the requester is network customer who is supplied a virtual network slice by a wireless network operator who operates the data analytics management (DAM) function and the request includes a request for network slice utilization. In some embodiments the request for data analytics information includes a request for network slice utilization for a particular network slice, and wherein configuring a plurality of DAM network functions to collect network data comprises configuring a plurality of DAM network functions to collect network data regarding usage from infrastructure elements utilized by the particular network slice.

Another aspect of the present invention provides a data analytics management (DAM) network function. Such a DAM function includes a network interface for receiving a data analytics request and for transmitting instructions. Such a DAM function further includes a processor and a non-transient memory for storing instructions which when executed by the processor cause the data analytics management network function to carry out the methods as described herein. In some embodiments the instructions cause the DAM function to configure a plurality of additional DAM network functions to collect network data dependent on a request for data analytics information received from a requester. Such instruction further cause the DAM function network to consolidate data received from the plurality of additional DAM network functions to produce the requested data analytics information to satisfy the request. Such instructions further cause the DAM function to supply the requested data analytics information to the requester. In some embodiments the instructions to configure a plurality of additional DAM network functions comprise instructions to instantiate any additional DAM network functions which have not been previously instantiated and are needed to satisfy the request. In some embodiments the DAM function is a network domain function and each of the plurality of additional DAM network functions are local DAM functions instantiated to collect data from local network infrastructure elements. In some embodiments the local DAM functions are instantiated close to the local network infrastructure elements. In some embodiments the local DAM functions supply different types of data, with the types of data being supplied being dependent on the request. In some embodiments DAM network function of claim 15 wherein the DAM function is a global domain function and the instructions to configure a plurality of additional DAM network functions comprises instructions to configure a plurality of domain network functions for providing DAM information on per domain basis, with each domain function configured to configure local DAM functions for collecting local DAM data from local network infrastructure elements. In some embodiments the request for data analytics information includes a request for network slice utilization for a particular network slice, and wherein the instructions to configure a plurality of additional DAM network functions to collect network data comprises instructions to configure a plurality of local DAM network functions to collect network data regarding usage from infrastructure elements utilized by the particular network slice.

BRIEF DESCRIPTION OF THE FIGURES

Further features and advantages of the present invention will become apparent from the following detailed description, taken in combination with the appended drawings, in which.

DETAILED DESCRIPTION

Next generation of wireless communications network (WCN) architectures are envisioned to provide a plurality of services to a plurality of types of customers using such features as Network Function Virtualization (NFV) and network slicing. Further there may different types of entities involved with providing communication services, including Virtual Network Operators (VNOs) who provide virtual network services, possibly using network infrastructure which is not owned or controlled by the VNOs.

With the advent of the internet of things (IoT), many thousands of devices can connect to a wireless network. Such devices are called machine type communication (MTC) devices which includes smart meters, which provide utility companies with usage information). Further, network operators may provide virtual networks to each utility, for example with each utility provided a network slice. Each utility may request data regarding its network usage, for example for network slice utilization, or for management functions such as monitoring the service being received, for forecasting or for scheduling communications during off-peak periods if dynamic (surge) pricing is used.

Figure 1:
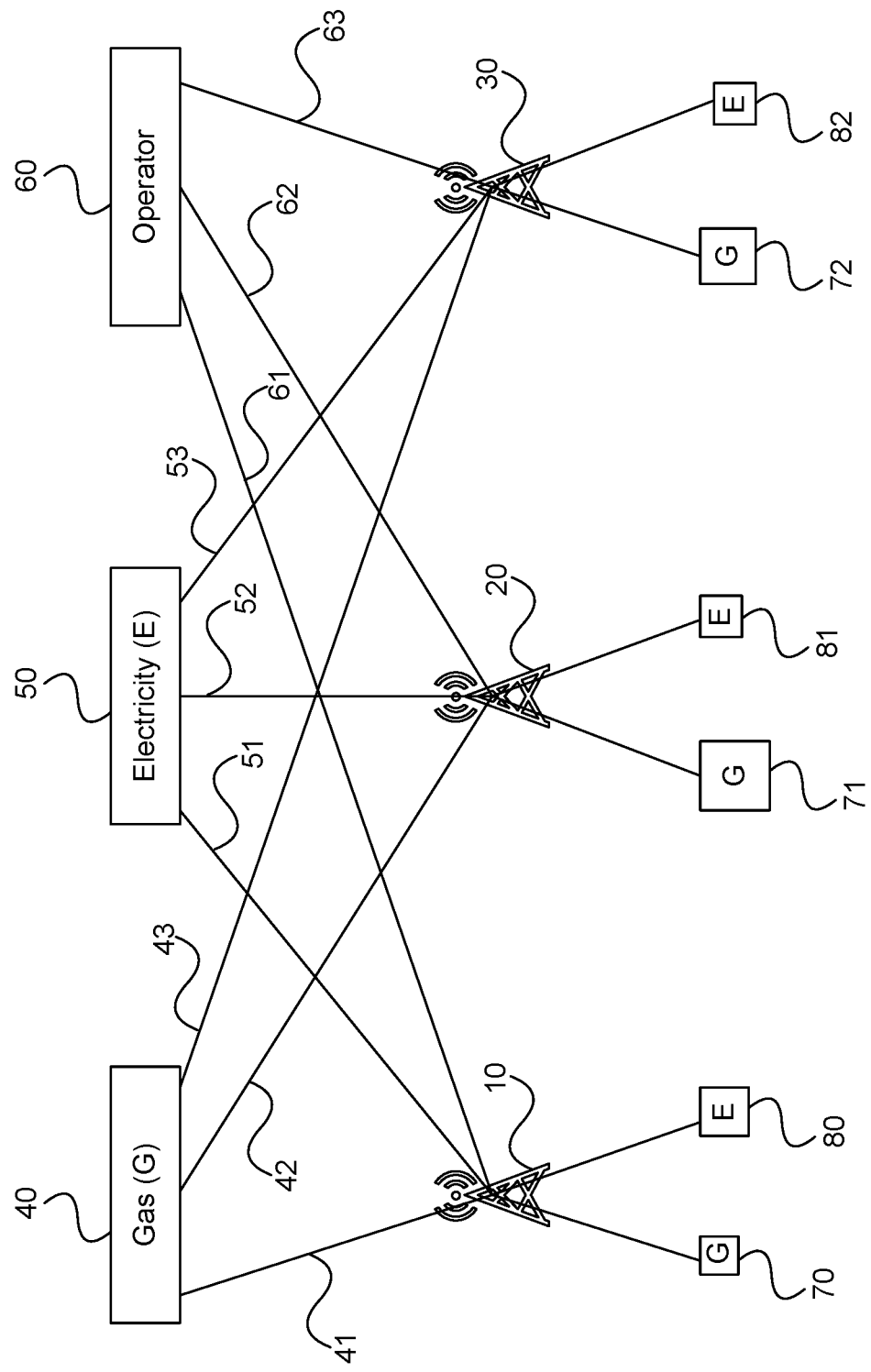
FIG. 1 schematically illustrates a series of base stations logging and supplying data to a plurality of requesters.

FIG. 1 schematically illustrates a series of base stations logging and supplying data to a plurality of requesters. In this example three access points (APs) 10, 20, 30, which may be base stations or other types of access nodes are shown. In this example two utilities, namely a gas utility 40 and an electric utility 50 are shown, as is a network operator 60. Each AP can provide connectivity to a large number of devices. For example AP 10 can provide connectivity to a large number of gas utility meters 70 and electric utility meters 80. Similarly, AP 20 can provide connectivity to a large number of gas utility meters 71 and electric utility meters 81 and AP 30 can provide connectivity to a large number of gas utility meters 72 and electric utility meters 82. Each AP can provide connectivity to other devices (not shown). Each AP 10, 20, 30 logs data regarding network usage. This data can be requested by various requesters. For example for gas utility 40 to obtain network utilization data for its devices, it would need to request data, possibly via an operation subsystem (OSS) from each AP by sending request 41 to AP 10, request 42 to AP 20 and request 43 to AP 30. The gas utility may do this for quality of service (QoS) or quality of Experience (QoE) assurance purposes, in order to obtain service delivery performance statistics and distributions. Similarly electric utility 50 may request data from each AP, again possibly via an OSS, by sending request 51 to AP 10, request 52 to AP 20 and request 53 to AP 30. Similarly network operator 60 would need to request data from each AP by sending request 61 to AP 10, request 62 to AP 20 and request 63 to AP 30. As can be appreciated, this is just an example and a typical network would have many additional APs, and requesters. Consequently these requests, and the subsequent responses, utilize network resources which can be significant, especially as the number of devices, and types of data to be logged increases.

Accordingly, rather than have each AP log data and provide the raw data to a number of different requesters, embodiments provide data analytics management (DAM) systems and methods which can collect and provide data, and in some embodiments analyze the data to satisfy different requests from different parties.

Figure 2:
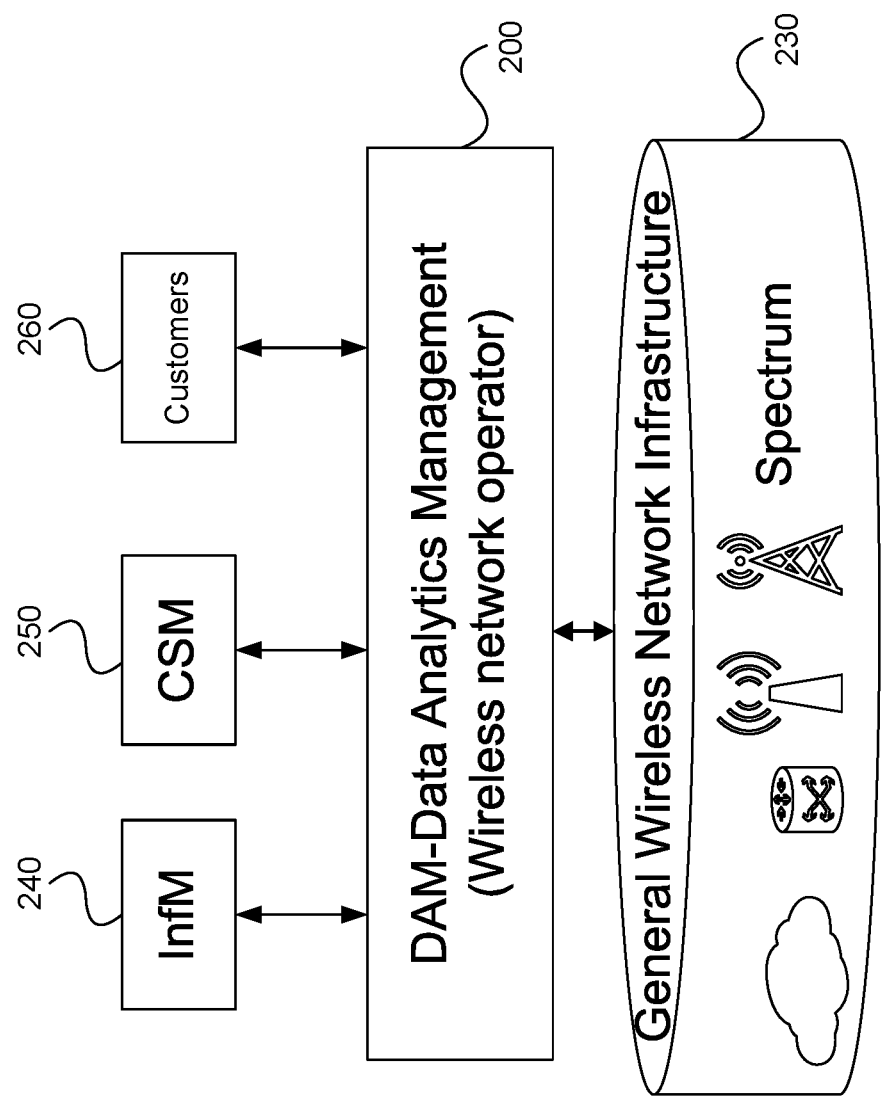
FIG. 2 illustrates an embodiment of a data analytics management (DAM) system which interacts with requesters and infrastructure.

FIG. 2 schematically illustrates interaction between DAM functions and other components according to an embodiment. In this embodiment, a DAM system 200, controlled by a wireless network operator, collects and analyzes data received from General Wireless Network Infrastructure (GWNI) elements 230. GWNI elements 230 include Radio Access Network (RAN) nodes such as receivers, antennas, base stations (BS), base transceiver stations (BTS), Node-B, evolved Node-B (eNodeB), a home Node-B, a home eNodeB, site controllers, APs, data centers, C-RAN clusters which include Remote Radio Heads (RRHs) controlled by a suitable controller, and other network components including network elements and links which route data between these nodes and other networks. The infrastructure elements 230 relay raw network data to the DAM system 200. The DAM system 200 can collect, consolidate, and in some cases analyze the data to provide information to the different entities according to the nature of each request. Accordingly, in some embodiments the DAM system 200 can provide a centralized aggregator of the different types of data to satisfy requests, and can provide and/or analyze different types of data depending on the nature of the request. As such, in some embodiments the DAM system can be configurable and can provide DAM as a service by providing on demand DAM to requesters. In some embodiments the DAM system 200, which can appear as a single centralized function, can actually be a distributed system. Accordingly, as will be explained below, the DAM system 200 can comprise a plurality of DAM entities. Accordingly, the DAM entities receive a request for information from a requester. The DAM entities receive the raw data from the GWNI elements, analyze this logged information and then output results to the requester. The results may be in the form of a database which is compiled by the DAM entities. As discussed above, the DAM entities may be organized into a hierarchical architecture. This enables the DAM entities to offer "DAM as a service" to DAM customers, in which the hierarchy of DAM entities acts as an interface to the GWNI for providing various types of data relating to network operations to requesters.

The requesters can include Infrastructure Management (InfM) entities 240, Customer Service Management (CSM) entities 250, or network customers 260. The infrastructure elements 230 will be owned by a service provider, but it should be appreciated that they are not necessarily owned by the same wireless network operator (WNO) as the owner of the DAM entities which receive the data. For example, a virtual network (VN) operator (VNO) may provide a VN service which operates over a WNO's infrastructure, for example by means of network slice. In this case, the VNO may operate DAM entities which collect and analyze information received from the WNO's infrastructure. Alternatively, the VNO may be the requester, and receive information from the WNO's DAM entities. One example of the information which can be provided by the DAM is slice resource utilization. This can be useful in determining whether the slice paid for is appropriate, or whether a larger or smaller slice should be utilized. In addition to indicating whether a larger or smaller slice should be utilized, some embodiments can also provide an indication of the amount of resources which should be either added to or reduced from the current slice. Further, some embodiments can inform whether any additional resources (for a larger slice) are available.

An InfM entity 240 is responsible for management of the GWNI 230, or a subset of the GWNI 230. It should be appreciated that not all of the GWNI elements 230 will necessarily be owned and operated by the same entity, and there may be a plurality of InfM entities. For example, an InfM entity 240 can be responsible for one or more of node configuration in the wireless access network, integration of private networks, integration of private Data center, and network topology configuration. The InfM entity 230 can request network statistics logs via a management plane interface, such as through an existing M-M interface as defined by the 3$^{rd}$ Generation Partnership Project (3GPP), for example through an M-M application program interface (API). The InfM entity 240 manages the infrastructure elements to allocate resources as needed to provide requested services. For example, the InfM 240 can turn off nodes when they are not needed and can throttle services or borrow resources when needed and available (possibly from other networks) when capacity does not meet demand. To do this the InfM entity 240 would request infrastructure resource utilization statistics and distribution. For example the InfM entity 240 would request traffic load distribution across a geographical area (which can include the load in clouds (e.g., within a data center) and in links).

The CSM entity 250 can also make requests via an MM API. It should be appreciated that CSM is a broad category, and can provide a variety of functions. For example, CSM can include quality of experience (QoE) assurance management, to ensure that quality of service (QoS)/QoE requirements are satisfied. For example, a CSM module 250 can track, analyze and report on such factors as QoS and delay. The CSM module 250 can track patterns and can allocate/change resources if need be to ensure QoE requirements are met. For example the CSM module 250 can be a CSM-QoS assurance function, which can request service delivery performance statistics and distributions, possibly on a per slice basis. As another example the CSM module 250 can be a CSM-QoS management function which can request e.g., per slice load statistics and distributions and/or per slice resource utilization and distributions. Accordingly the CSM module 250 requests network data, which can be provided by DAM entities 200 described herein. CSM 250 can also include context management function in which different contexts may be defined for different services, and different contexts may be managed on a service-by-service basis. For example the CSM module 250 can be a CSM-Context function which can request, for example, device commute pattern statistics and/or device communication pattern statistics. Another example is CSM charging. It should be appreciated that in typical LTE networks, logging traffic and charging is performed by a Packet Gateway (P-GW). However this only works for traffic flows between the wireless network and the internet. As more functions are provided inside the RAN, there is likely to be larger volumes of traffic that do not leave the network. In addition to being able to charge for the processing of data in the RAN, an operator may need the ability to charge customers for inter-network traffic. Furthermore, even when charging is not a factor, being able to obtain traffic statistics for traffic that does leave the network is important for network slice provisioning in networks that make use of virtualization. Accordingly, there is a need for CSM charging and logging for more general data flows. Embodiments provide a distributed logging and charging CSM solution. Each of these will be discussed in more detail below. Another example includes CSM Authentication and Authorization. More details of a CSM application which can interface with the DAM entities of the present disclosure are discussed in U.S. provisional patent Ser. No. 62/169,084 filed Jun. 1, 2015, which is hereby incorporated by reference in its entirety.

Accordingly the DAM system 200 provides data analytics management (DAM) which provides data log and analytics service to all above entities based on the requirements of the requesting entity. In some embodiments the DAM system 200 is the only management entity which is provided data access from the GWNI. This way other management entities are isolated from the raw data to avoid the unnecessary duplication of requests (and the resulting drain on resources). In some embodiments the DAM system 200 enables "data analytics as a service" which can be provided to both a network operator's management entities and also to 3rd parties. In some embodiments, this is simplified by the use of unified interfaces such as M-M APIs.

Figure 3:
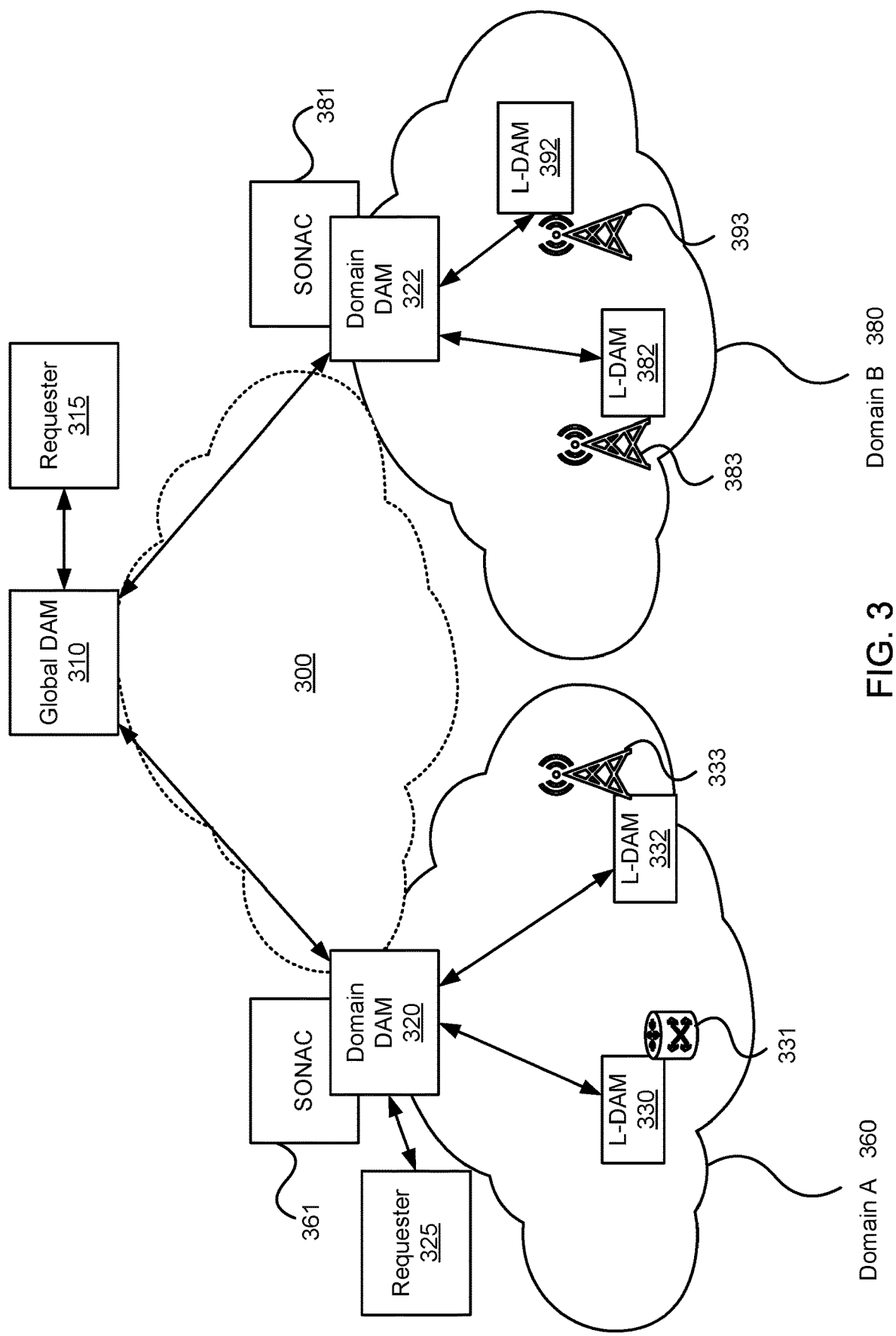
FIG. 3 illustrates a wireless communications network (WCN) architecture which includes DAM functions, according to an embodiment.

Referring to FIG. 3, there is shown an embodiment of a wireless communications network (WCN) which includes a hierarchical data analytics management (DAM) logical architecture. This architecture includes a logical topology with various DAM functions deployed on different components of the WCN. The WCN includes two network operator domains (Domain A 360 and Domain B 380), linked by a high capacity transport network 300. Each domain has a domain DAM function associated with it. The example DAM hierarchy illustrated in FIG. 1 includes a global DAM function 310, which can be deployed in a Data Center (DC) Cloud, and in some embodiments may be administered by a third party trusted by each domain operator. Below the global DAM is a plurality of domain DAM function (D-DAM) 320, 322. Each domain DAM function can be deployed in conjunction with a Service Oriented Network Auto Creation (SONAC) instance 361, 381, if needed. Each domain can have a plurality of local DAM functions (L-DAMs). Domain A 360 is shown to include L-DAM 332 associated with an access point 333, which could be a cluster of remote radio heads, centrally controlled by one or more controllers. Domain A 360 also includes L-DAM 330 associated router 331. Domain B 380 is shown to include L-DAM 382 associated with an access point 383, and L-DAM 392 associated with an access point 393. It should be noted that this is a simplified drawing, with only two infrastructure elements shown per domain, but there would typically be many infrastructure elements in a domain. Further a local DAM can be associated with a plurality of APs (i.e., relays and in some embodiments analyzes data generated by a plurality of APs). As will be discussed below, there are potentially multiple levels of DAM functions (e.g., global/domain/local/etc.). However such a distributed system can include more levels for larger networks. For example, a local DAM can be responsible for collecting data for a local region of a few square kilometers, whereas a city DAM can collect and analyze data from the local DAMs within a city, and there may be regional DAMs in the next level of the hierarchy, with a provincial or national DAM above that. Example embodiments will be discussed with reference to a simplified hierarchy including local, domain and global levels, each with their own DAM entities.

In the implementation of a large network, it may be advantageous to divide the network into a series of smaller network segments. In some implementations, different network segments may be created on sets of infrastructure operated by different infrastructure providers. These segments may form the basis for different network domains and can be considered a separate network with a network ID. The global DAM 310 collects and analyzes data on an inter-domain basis. It can provide on-demand data analytics information for any network segment overseen by a D-DAM, and global data analytics information based on the data accessible to the global DAM. In some embodiments, DAM services can be provided on-demand at any level in the hierarchy. It should be appreciated that in some embodiments, the global DAM entity may not be needed for a network operator with a single domain which does not require inter-domain DAM.

As used herein, "SONAC" refers to a Service Oriented Network Auto Creation technology, which can be thought of as a software controller. In various embodiments, SONAC includes three enabling technologies, namely Software Defined Topology (SDT), Software Defined Resource Allocation (SDRA), and Software Defined Protocol (SDP). In a given SONAC instance, some or all of SDT, SDRA and SDP may be used. Which of these technologies are included in a given SONAC instance can be controllable. In embodiments where the network makes use of virtualization, some of these SONAC functions may reside in an orchestrator.

As shown in FIG. 3, embodiments can include a hierarchical logical topology of the DAM entities, each providing different aspects of DAM. A global DAM 310 can manage the DAM requirements of a network, or across networks, through interactions with domain specific DAM entities 320 and 322. The global DAM function 310 is communicatively coupled to domain DAM entities 320, 322 through a transport network 300. Domain DAM 320 may receive and reply to requests from a requester 325 and global DAM 310 may receive and reply to requests from a requester 315, as will be discussed below. Within a domain, a plurality of local DAM functions is established, as shown by way of example through the plurality of instances from 330, 332, 382 and 392. Domain specific DAM functions and the Global DAM functions may be virtualized entities supported by a data center, or across a number of data centers. These entities can be either discrete entities or virtualized functions resident in a cloud environment. Similarly, the local DAM functions can be supported by a data center, or may be instantiated as software modules executing on processors of local network infrastructure elements.

Local DAM functions may be instantiated as needed to perform edge DAM functions. In some embodiments, this can be done on a per-user or per-device basis. In other functions, there is another level of virtual user DAM functions reporting to the Local DAM. It should be appreciated that each DAM function may be geographically separated and individually deployed on different components of a WCM (not shown). Although not shown, a service specific virtual DAM entity could also be instantiated to serve the needs of MTC devices that all interact with the same service.

Local DAM (L-DAM) functions will now be discussed, according to embodiments. A local DAM entity can log, analyze and report on infrastructure parameters within a local area, for example a couple of square kilometers. However it should be appreciated that the size of a local DAM area will depend on the population density, expected traffic (both amount and types), and the types of GWNI in the area, as well as the processing power and bandwidth that can be dedicated to the local DAM functions. In some embodiments, the local DAM will simply relay data to another function (for example the domain DAM), which will analyze the data. In other embodiments, the local DAM can analyze (or partially analyze the data), and provide the analysis to the domain DAM, with or without data. Local DAM functions can be established for individual infrastructure elements, of for clusters of infrastructure elements. Accordingly, decisions of where to physically place, or instantiate, local DAM functions can use strategies similar to those used in deciding where to place network infrastructure nodes. Further, for networks which use Network Function Virtualization (NFV), DAM functions can be instantiated along with other Virtualized Network Functions (VNFs), such as a virtual service-specific or user-specific Serving Gateway (v-s/u-SGW). In some embodiments, such user or service specific DAM functions can be local DAM functions. In other embodiments, service/user specific DAM functions can be instantiated when needed, in a hierarchical level below the local DAMs.

Examples of local DAM functionality will now be discussed, according to embodiments. A local DAM function can provide a raw data log on demand (e.g., upon request). Such a data log can include network resource status, traffic load status and service delivery status. The network resource status can include physical network resource status information, including link status and processor status. It should be appreciated that the processor status may be derived from the buffer/queue status. The physical network resource status can be provided by the WNO infrastructure elements for the WNO usage. This can be provided to the InfM in response to a request from the InfM. Virtual network/slice resource status data can also be provided—for example slice resource utilization statistics, which can be provided by the VNO. Examples of the service delivery statistics include slice service QoE statistics (which may be requested by a WNO CSM-QoE entity, or by the VNO), or per customer or service QoE statistics (which may be requested by a WNO CSM-QoE entity or by customers of the WNO).

These status reports can be provided to the domain DAM (which can aggregate and provide more comprehensive reports to the requester) or directly to the requester (e.g., CSM or InfM entities). The reports need not be transmitted directly from the local DAM to the domain DAM. As an alternative, the local DAM functions may save data to one or more databases, which may be accessed by the domain DAM functions. As well as raw data, a local DAM entity can provide local data analytics information upon request.

In some embodiments, the local DAM functions are instantiated and configured by the domain DAM function, possibly by sending a request to a software defined topology (SDT) entity, such as an orchestrator.

Domain DAM (D-DAM) functions will now be discussed, according to embodiments. The D-DAM functions instantiate and configure the L-DAM functions. As should be appreciated, the D-DAM functions can determine the location for the L-DAM functions (for example, in relation to the network topology). Alternatively other network functions may provide input on where such functions should be placed. A SONAC instance or Virtual Network Function Manager (and/or Orchestrator) may carry out the instantiation and configuration of VNF L-DAM entities, based on instructions from the D-DAM functions. The D-DAM functions collect information from the L-DAMs and analyze the data. The DAM data includes network resource management related data, which may be of interest to the WNO or to WNO's customers, for example VNO operators. The WNO may collect and analyze domain wireless network resource utilization and traffic load distribution over a geographic area or on a domain or slice basis, for example for GWNI resource pool management purposes. Similarly, a VNO may collect and analyze slice resource utilization and traffic load distribution over a geographic area or on a domain or slice basis, in order to ascertain the need for VN/Slice updates. For example, a VNO can monitor slice utilization to determine if a larger or smaller slice is needed to meet current demand levels. The D-DAM data can also include QoE assurance data useful for charging and/or renegotiation for the levels of service provided. This QoE data can depend on the type of customer. For example QoE includes latency and rate for individual customers, or whether a satisfactory ratio was delivered for domain VNO customers. Vertical customers, for example, utility companies or other enterprise network operators, typically have multiple devices using a combination of services. The QoE/QoS data for such customers includes statistics of rate, latency etc., which can be analyzed over all or a subset of their devices.

The D-DAM data can be made available to either the global DAM or other requesters by saving the data to one or more accessible databases.

Global DAM functions will now be discussed, according to embodiments. In some situations, a WNO may subdivide a network into different domains for management reasons. The global DAM function can be administered by a WNO to provide information across its entire network. Alternatively, the global DAM function can be operated by a $3^{rd}$ party which provides inter-network information to and about each WNO, in which case each WNO can be considered a domain. The global DAM functions are similar to those of the D-DAM functions, but provide a global view of the load distribution over a geographic area. This can be useful to WNOs who provide or utilize VNs using the GWNI of other WNOs. As but one example, a global DAM can be useful for supplying data analytics information to customers who may have network services provided by more than one WNO. For example a utility company may have some meters served by a first WNO, while other meters, possibly in another city, served by a second WNO. The global DAM can consolidate network usage for the entire utility company, by interacting with a domain DAM associated with each WNO network.

Figure 4:
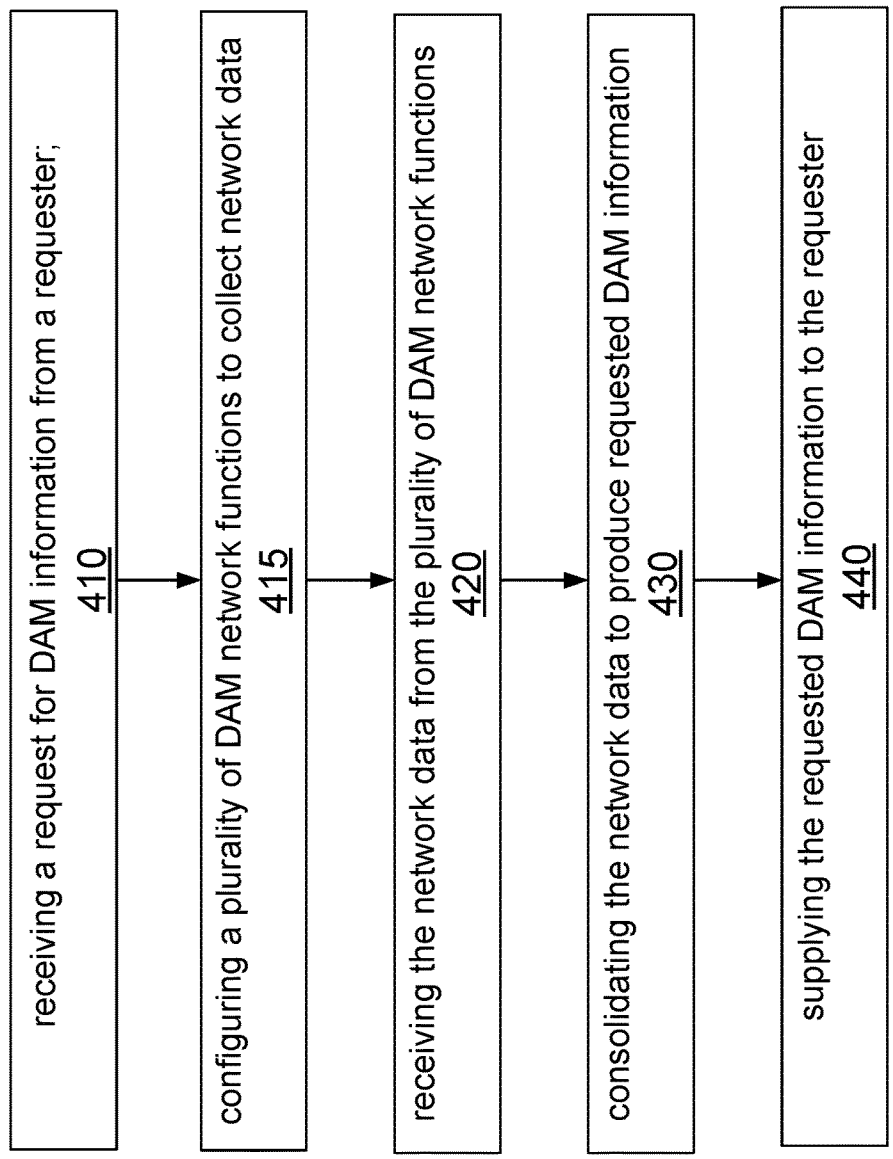
FIG. 4 is a flowchart illustrating a method of providing data analytics information according to an embodiment

A method of providing data analytics information according to an embodiment is illustrated in FIG. 4. Such a method can be executed by a first data analytics management (DAM) function. The method includes at step 410 receiving a request for data analytics information from a requester. The method further includes at step 415 configuring a plurality of DAM network functions to collect network data. The method further includes at step 420 receiving the network data from the plurality of DAM network functions. The method further includes at step 430 consolidating the network data to produce the requested data analytics information to satisfy the request. The method further includes at step 440 supplying the requested data analytics information to the requester. Additional non-limiting examples which provide more details to supplement these method steps depending on such factors as the nature of the request, and network configuration, will now be discussed.

Figure 5:
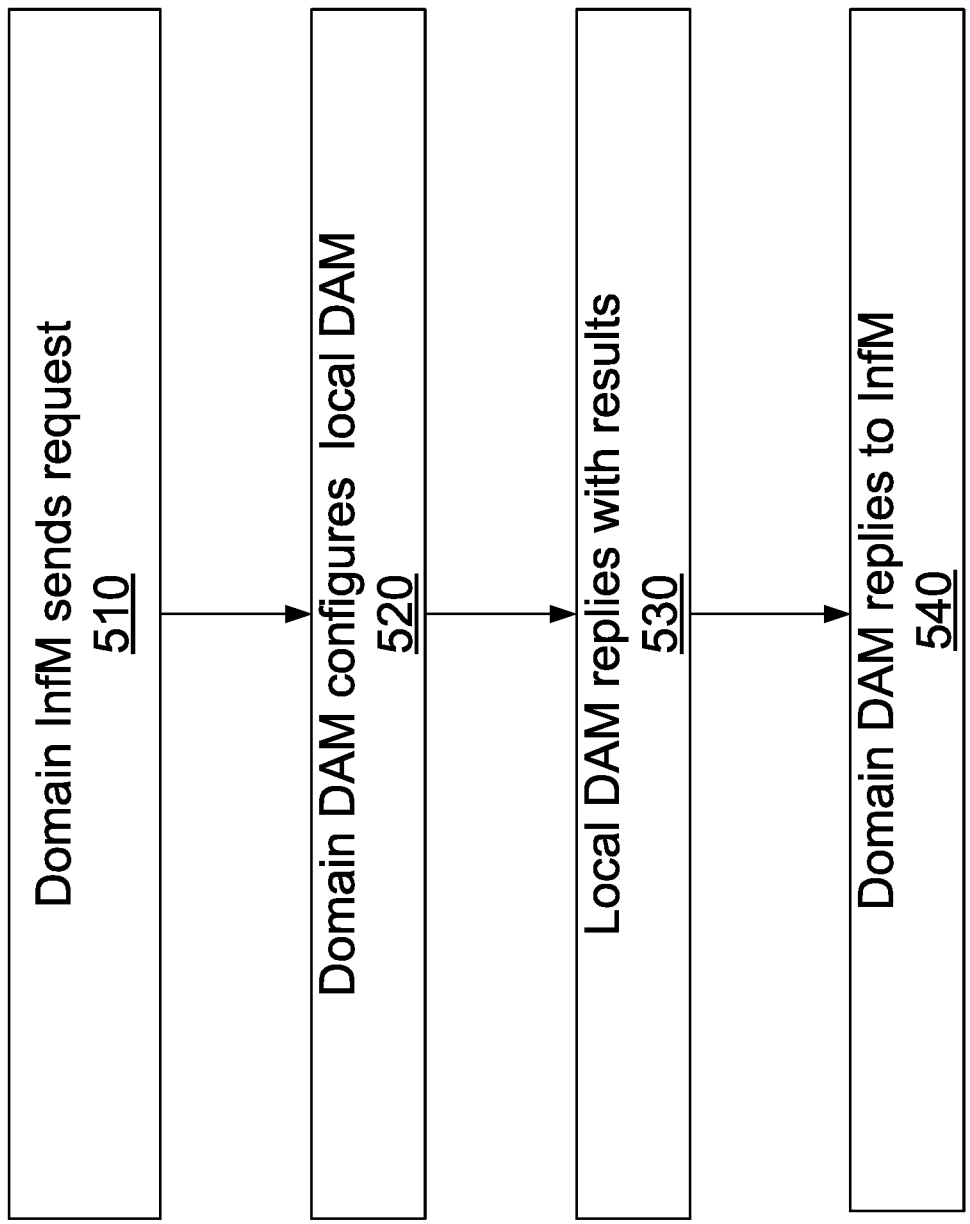
FIG. 5 is a flowchart illustrating DAM interaction with an infrastructure manager, according to an embodiment.

A procedure for DAM interaction with an InfM requester will now be discussed with reference to FIGS. 3 and 5, according to an embodiment. FIG. 5 is a flowchart illustrating DAM interaction with a domain InfM entity according to an embodiment. In this example, the requester 325 is a domain InfM module. The domain InfM sends a request 510 to the D-DAM 320, for example for network resource statistics and/or traffic load statistics. It should be appreciated that this example also works for a global InfM acting as requester 315 of the global DAM 310. In response to the request, the D-DAM 320 configures 520 the L-DAMs 330, 332. It should be appreciated that this step assumes the L-DAMs are already instantiated but if not, the L-DAMs would be instantiated first. It is noted that in this specification DAMs may be used as short form for DAM entities or functions. The L-DAMs reply 530 with the results, which can be via signaling to the D-DAM. The reply may be in the form of transmitted data, or a notification of a database creation/update with the requested data which can be accessed by the D-DAM. The D-DAM 320 then replies 540 to the requester 325 (in this example, the InfM).

Figure 6:
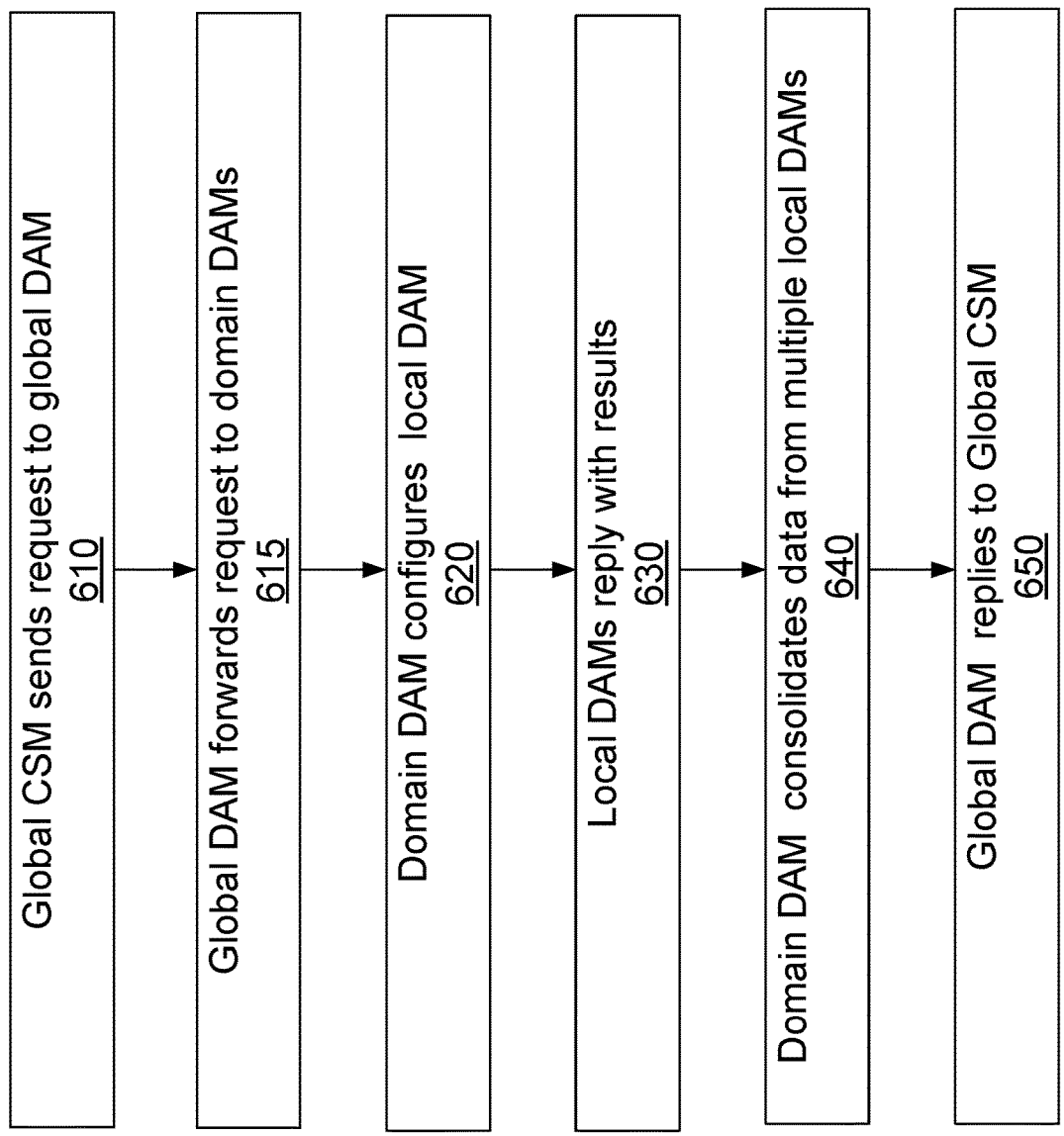
FIG. 6 is a flowchart illustrating DAM interaction with a Customer Service Management (CSM) entity according to an embodiment.

A procedure for DAM interaction with a CSM requester will now be discussed with reference to FIGS. 3 and 6, according to an embodiment. FIG. 6 is a flowchart illustrating DAM interaction with a global CSM entity according to an embodiment. In this example, the requester 315 is a Global CSM entity, for example a CSM-QoE function providing QoE assurance on a per customer basis. The CSM function sends request 610 for QoE statistics to the Global DAM function 310. The QoE statistics can be requested on a per service basis, per customer basis or other basis. Global DAM 310 forwards the request 620 to domain DAMs 320, 322. The domain DAMs 320, 322 configure 620 the local DAMs. In particular, domain DAM 320 configures L-DAMs 330, 332, whereas domain DAM 322 configures L-DAMs 382, 392. It should be appreciated that the local DAMs should be instantiated prior to configuration. Accordingly, if any of the local DAMs are not already instantiated, the domain DAM function will cause them to be instantiated in NFV enabled nodes (e.g., network elements). In some embodiments, the domain DAM function will determine the location and requirements for the local DAM functions, and then request SONAC entities 361, 381 to instantiate the local DAM functions in accordance with the requested location and requirements. In one embodiment, a local DAM function can be co-located with a v-s/u-SGW, if local DAMs are established on a per user/service basis. The L-DAM functions reply 630 to their respective domain DAM function with the results. The reply may be in the form of database creation/update with the requested data. Each domain DAM function then collects data from each of its local DAM functions, consolidates 640 this data and may perform further analysis before replying to the global DAM function. Global DAM 310 then collects data from each of the domain DAM functions, consolidates this data and may perform further analysis if needed before replying 650 to the CSM-QoE module. This reply may be in the form of a message, or by providing a database which includes and organizes the requested data. It should be appreciated that this is just an example, and this procedure can apply for other global requesters, for example a global CSM-charging entity.

Figure 7:
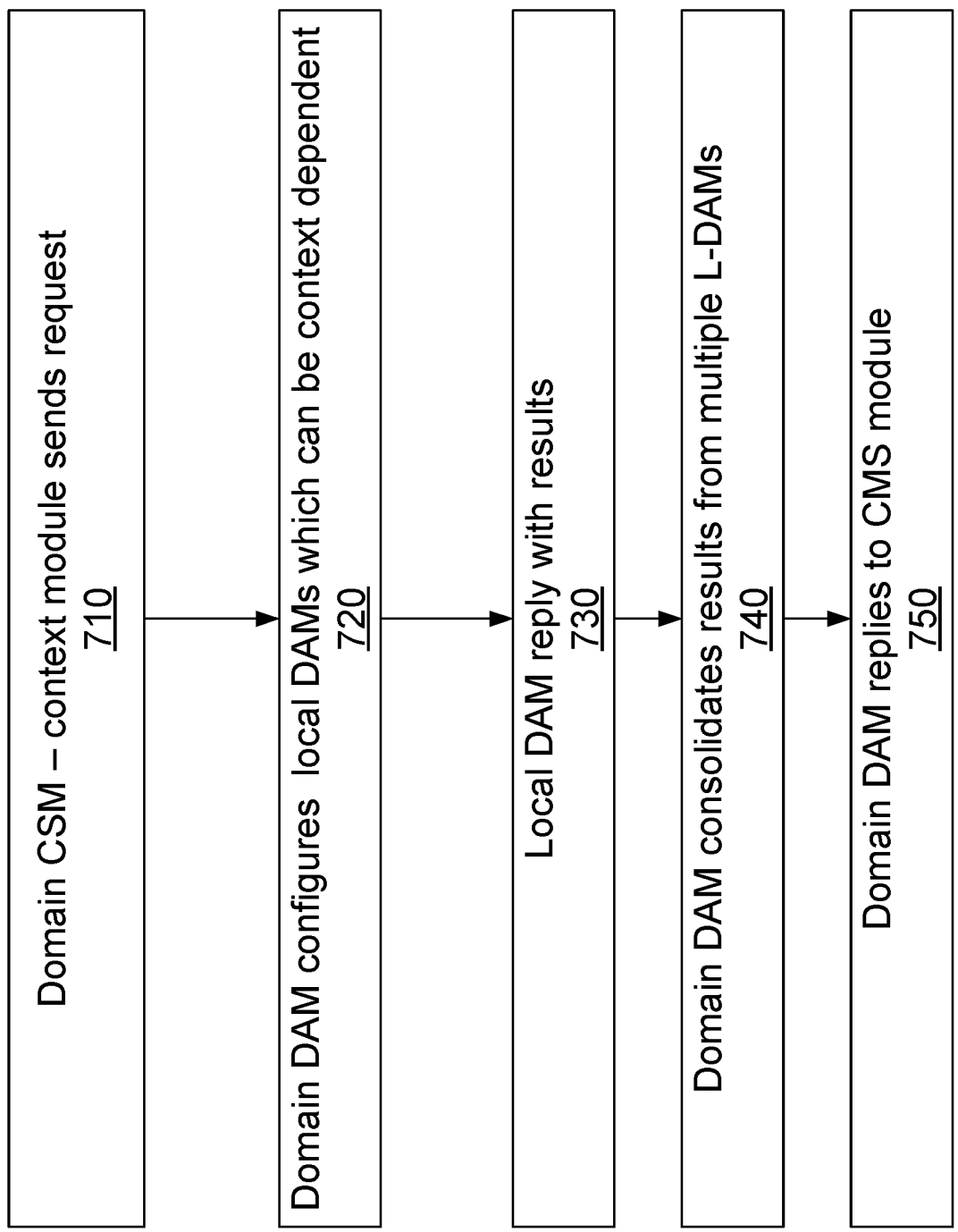
FIG. 7 is a flowchart illustrating DAM interaction with a CSM entity according to another embodiment.

Further, it should be appreciated that both CSM-QoE assurance and charging functions can be performed on a per domain level using a domain CSM requester. A procedure for DAM interaction with a CSM requester will now be discussed with reference to FIGS. 3 and 7, according to an embodiment. FIG. 7 is a flowchart illustrating DAM interaction with a domain CSM entity according to an embodiment. In this example, the requester 325 is a domain CSM entity, for example a CSM-context module which performs service context management. The domain CSM-context module sends a request 710 to the D-DAM 320, for example for per-service context statistics. In response to the request, the D-DAM 320 configures 720 the L-DAMs 330, 332. It should be appreciated that, if necessary, the L-DAMs would need to be instantiated first. Accordingly, if any of the local DAMs are not already instantiated, the domain DAM will cause them to be instantiated. In some embodiments, the domain DAM will determine the location and requirements for the local DAMs, and then request to a SONAC entity to instantiate the local DAMs in accordance with the requested location and requirements. The placement of a local DAM function can be context dependent. In one embodiment, a local DAM function can be co-located with a v-s/u-SGW, if local DAMs are established on a per user/service basis, depending on the application preference and QoS/QoE requirements and functions. If the context is for mobile user equipment, and the network utilizes virtual-user connectivity management (v-u-CM) instances, then the L-DAM function can be co-located with the v-u-CM. For an example of v-u-CM, see provisional applications U.S. Ser. No. 62/186,168 filed Jun. 29, 2015 and U.S. Ser. No. 62/213,452 filed Sep. 2, 2015, both of which are hereby incorporated by reference in their entirety.

The L-DAMs reply 730 with the results, which can be via signaling, or the reply may be in the form of database creation/update with the requested data. The D-DAM 320 then collects and consolidates 740 the results from multiple L-DAMs, and can perform further analysis. For example, for a vertical service in which an enterprise customer utilizes a large number of devices and requires further analytics for controlling traffic between its devices and servers. The D-DAM 320 then replies 750 to the requester 325 (in this example, the CSM module). The reply can be in the form of a message and/or in the form of a database creation/update with the requested data. It should be appreciated that this example can be extended for a global CSM-context module acting as requester 315 of the global DAM 310.

Figure 8:
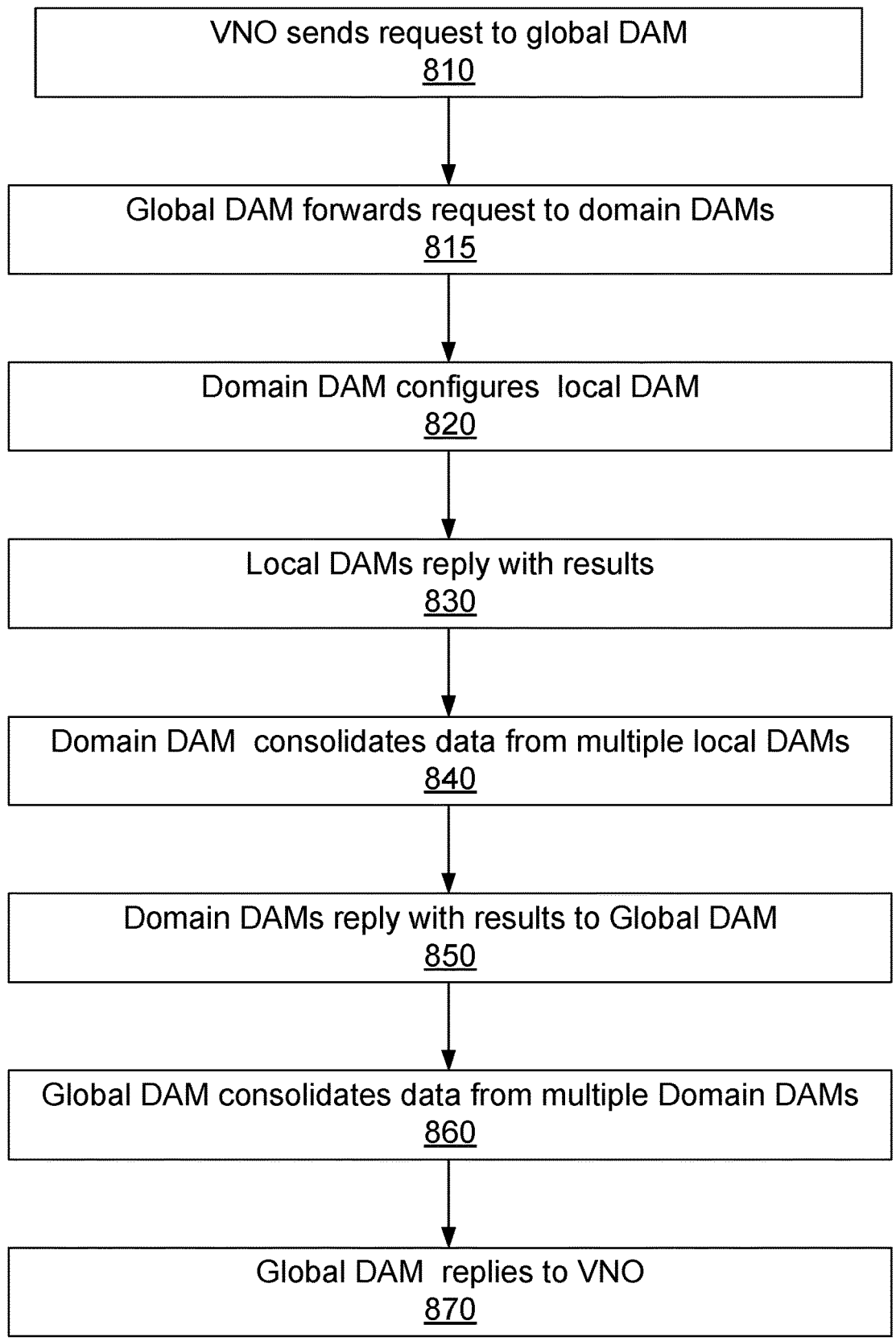
FIG. 8 is a flowchart illustrating DAM interaction with a Virtual Network Operator (VNO) according to another embodiment.

A procedure for DAM interaction with a VNO requester will now be discussed with reference to FIG. 8 according to an embodiment. In this example, the requester is a VNO, which sends request 810 for VN resource utilization statistics and VN traffic statistics to the Global DAM function. As an example, it is noted this could be useful for determining whether a VN or slice update would be useful, for example increasing or reducing the amount of resources allocated to a VN or a slice. Global DAM forwards the request 815 to domain DAMs which are involved in the VN. The domain DAMs configure 820 the local DAMs. It should be appreciated that the local DAMs should be instantiated prior to configuration. Accordingly, if any of the local DAMs are not already instantiated, the domain DAM will cause them to be instantiated. In some embodiments, the domain DAM will determine the location and requirements for the local DAMs, and then request to a SONAC entity to instantiate the local DAMs in accordance with the requested location and requirements based on the logical topology of the VN. In one embodiment, a local DAM can be co-located with a v-s/u-SGW, if local DAMs are established on a per user/service basis within the VN. The L-DAMs reply 830 to their respective domain DAM with the results. The reply may be in the form of database creation/update with the requested data. Each domain DAM then collects data from each of its local DAMs, consolidates 840 this data and may perform further analysis before replying 850 to the global DAM. Global DAM then collects data from each of the domain DAMs, consolidates 860 this data and may perform further analysis if needed before replying 870 to the VNO requester. The replies may be in the form of a message, or by providing a database which includes and organizes the requested data. As stated, this information can be used by the VNO for determining if a VN slice update is desired, which can include increasing or reducing the VN resources allocated to the slice. Further, it should be appreciated that VNO resource and traffic utilization statistics can be requested just at the domain level using a domain VNO requester.

As indicated, different entities in the hierarchy can communicate with entities in other levels by providing updates to databases with the updated data. In some embodiments, this database content can include GWNI related data regarding the topology of the network, including communication between elements associated with particular clouds and bandwidth capacity; and infrastructure utilization, capacity and loads. The database content can include information related to per slice or per VN resource utilization and loading, as well as per slice or per service QoE data.

Embodiments can accommodate networks built to provide a plurality of services to a plurality of device types. For example, smart phones or other user equipment may require different types of services (voice calls, texting, and data file exchanges). Further networks need to consider the mobility and unpredictable nature of the demands made by such devices. Machine to machine customers, for example a utility company deploying thousands of smart meters, may require more predictable service, possibly with predictable timing and duration.

Figure 9:
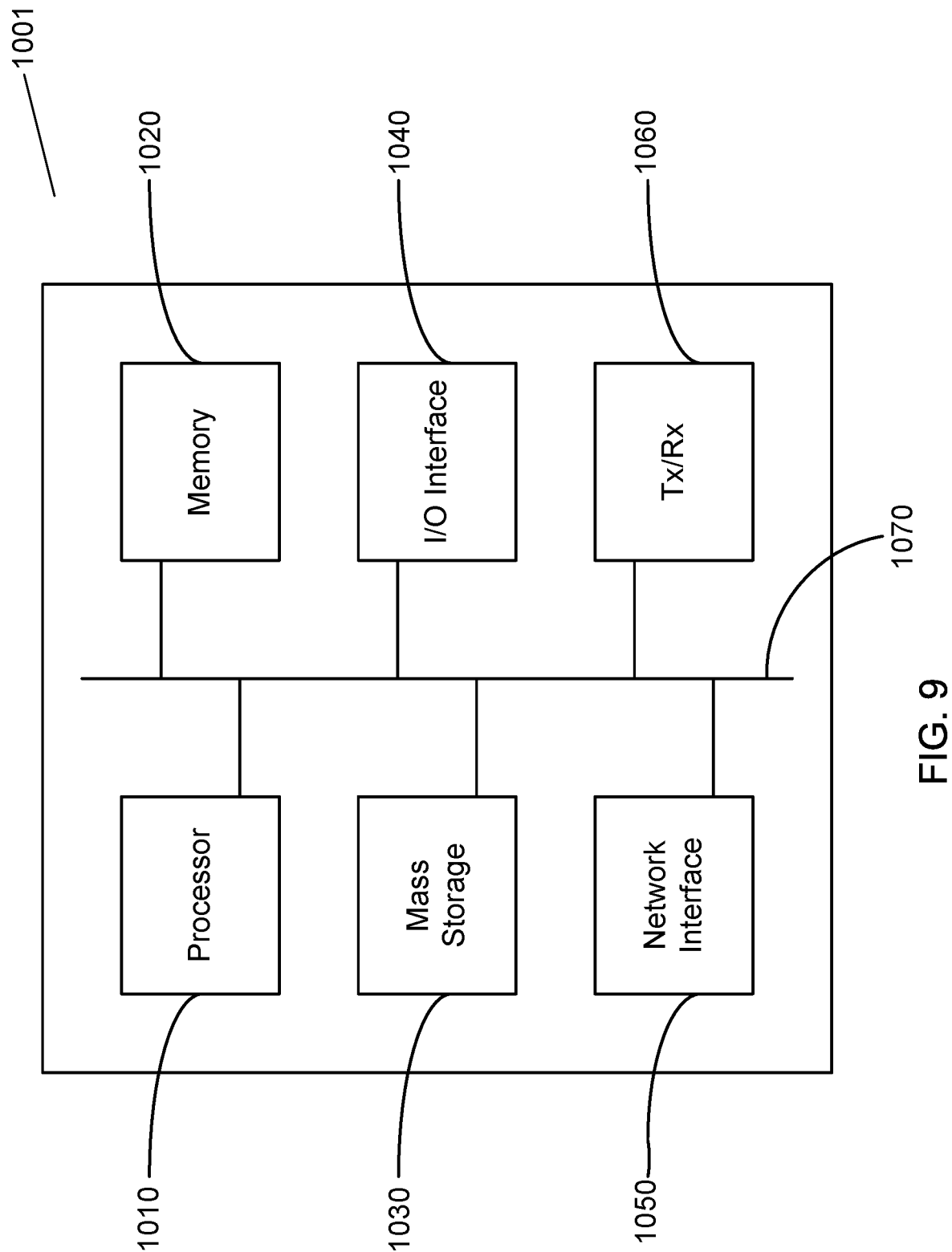
FIG. 9 illustrates a processing system that may be used for deployment or instantiating components of the WCN.

FIG. 9 is an exemplary block diagram of a processing system 1001 that may be used for deploying or instantiating components of the wireless communication network, such as the DAM, CSM and InfM entities. As shown in FIG. 9, processing system 1001 includes a processor 1010, memory 1020, non-transitory mass storage 1030, network interface 1050, I/O interface 1040, and transceiver 1060, all of which are communicatively coupled via bi-directional bus 1070. The processing system 1001 further includes input terminals and output terminals, for receiving inputs and outputs, respectively, from other network components (not shown).

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specifications and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method of providing data analytics information, the method executed by a network domain function comprised in a data analytics management (DAM) system, the method comprising:
receiving a request, from a requester, for data analytics information, the request including a request for network slice utilization for a virtual network slice, the virtual network slice comprising a single virtual infrastructure that spans multiple physical networks and provides scalable network resources dedicated and chargeable to a particular customer entity to provide a service, wherein the requester is a customer of the DAM system and the requester manages the scalable network resources to meet requirements of the service;
configuring a plurality of DAM network functions to collect network data;
receiving the network data from the plurality of DAM network functions;
processing the network data to produce the requested data analytics information to satisfy the request; and
supplying the requested data analytics information to the requester;
wherein:
the plurality of DAM network functions comprises a global DAM function, a domain DAM function below the global DAM function, and a local DAM function below the domain DAM function; and
configuring the plurality of DAM network functions comprises the domain DAM function configuring the local DAM function to collect network data regarding usage from local network infrastructure elements utilized by the virtual network slice.

2. The method of claim 1 wherein configuring the plurality of DAM network functions further comprises instantiating any DAM network functions which have not been previously instantiated and are needed to satisfy the request.

3. The method of claim 1 wherein receiving the network data includes retrieving the network data from a database populated by each of the plurality of DAM network functions.

4. The method of claim 1 wherein the local DAM functions are instantiated close to the local network infrastructure elements.

5. The method of claim 1 wherein the local DAM functions are instantiated within a node for collecting data from a cluster of network infrastructure elements.

6. The method of claim 1 wherein the location of the local DAM functions are dependent on the nature of the request.

7. The method of claim 1 wherein the local DAM functions supply different types of data, with the data being supplied being dependent on the request.

8. The method of claim 1 wherein the requester is an infrastructure manager function.

9. The method of claim 1 wherein the requester is a Customer Service Management (CSM) function.

10. A data analytics management (DAM) network function comprising:
a network interface for receiving a data analytics request and for transmitting instructions;
a processor;
a non-transient memory for storing instructions which when executed by the processor cause the data analytics management network function to:
receive a request, from a requester, for data analytics information, the request including a request for network slice utilization for a virtual network slice, the virtual network slice comprising a single virtual infrastructure that spans multiple physical networks and provides scalable network resources dedicated and chargeable to a particular customer entity to provide a service, wherein the requester is a customer of the DAM system and the requester manages the scalable network resources to meet requirements of the service;
configure a plurality of additional DAM network functions to collect network data dependent on the request;
process network data received from the plurality of additional DAM network functions to produce the requested data analytics information to satisfy the request;
supply the requested data analytics information to the requester;
wherein the DAM function is a global function and the plurality of additional DAM network functions comprises a domain DAM function below the global function and a local DAM function below the domain DAM function, the instructions to configure a plurality of additional DAM network functions comprising the domain DAM function configuring the local DAM function to collect network data regarding usage from infrastructure elements utilized by the virtual network slice.

11. The DAM network function of claim 10 wherein the instructions to configure the plurality of additional DAM network functions further comprise instructions to instantiate any additional DAM network functions which have not been previously instantiated and are needed to satisfy the request.

12. The DAM function of claim 10 wherein the DAM function is a network domain function and each of the plurality of additional DAM network functions are local DAM functions instantiated to collect data from local network infrastructure elements.

13. The DAM function of claim 12 wherein the local DAM functions are instantiated close to the local network infrastructure elements.

14. The DAM function of claim 12 wherein the local DAM functions supply different types of data, with the types of data being supplied being dependent on the request.

15. A communication system comprising a data analytics management (DAM) network function, a requester being a customer of the DAM system and the requester manages the scalable network resources to meet requirements of a service, and a plurality of DAM network functions, the data analytics management network function configured to:
receive a request, from the requester, for data analytics information, the request including a request for network slice utilization for a virtual network slice, the virtual network slice comprising a single virtual infrastructure that spans multiple physical networks and provides scalable network resources dedicated and chargeable to a particular customer entity to provide the service;
configure the plurality of DAM network functions to collect network data;
receive the network data from the plurality of DAM network functions;
process the network data to produce the requested data analytics information to satisfy the request; and
supply the requested data analytics information to the requester;
wherein:
the plurality of DAM network functions comprises a global DAM function, a domain DAM function below the global DAM function, and a local DAM function below the domain DAM function; and
configuring the plurality of DAM network functions comprises the domain DAM function configuring the local DAM function to collect network data regarding usage from local network infrastructure elements utilized by the virtual network slice.

16. The communication system of claim 15 wherein the data analytics management network function is further configured to instantiate any DAM network functions which have not been previously instantiated and are needed to satisfy the request.

17. The method of claim 1 further comprising adjusting an amount of the infrastructure elements utilized by the virtual network slice based on the data analytics information.

18. The data analytics management (DAM) network function of claim 10 wherein, in response to supplying the requested data analytics information to the requester, an amount of the virtual infrastructure utilized by the virtual network slice is adjusted based on the requested data analytics information.

19. The communication system of claim 15 wherein, in response to supplying the requested data analytics information to the requester, an amount of the virtual infrastructure utilized by the virtual network slice is adjusted based on the requested data analytics information.

20. The method of claim 1 wherein the configuring a plurality of DAM network functions comprises configuring the plurality of DAM network functions based upon physical clusters of infrastructure elements.

21. The data analytics management (DAM) network function of claim 10 wherein the configuring the plurality of additional DAM network functions comprises configuring the plurality of additional DAM network functions based upon physical clusters of infrastructure elements.

22. The communication system of claim 15 wherein the configuring the plurality of DAM network functions comprises configuring the plurality hierarchy of DAM network functions based upon physical clusters of infrastructure elements.

23. The method of claim 1 wherein the plurality of DAM network functions further comprises a service specific DAM function or a user specific DAM function instantiated below the local DAM function.

24. The data analytics management (DAM) network function of claim 10 wherein the plurality of additional DAM network functions further comprises a service specific DAM function or a user specific DAM function instantiated below the local DAM function.

25. The communication system of claim 15 wherein the plurality of DAM network functions further comprises a service specific DAM function or a user specific DAM function instantiated below the local DAM function.

26. The DAM network function of claim 10 wherein the multiple physical networks includes General Wireless Network Infrastructure (GWNI) elements, the network data including data based on traffic that does not leave the GWNI element, at least one the GWNI elements being a Radio Access Network (RAN) node.

27. The DAM network function of claim 26 wherein the plurality of DAM entities interfaces with the GWNI element and the data analytics information includes an aggregation of data provided by the plurality of DAM network functions.

28. The communication system of claim 15 wherein the multiple physical networks includes General Wireless Network Infrastructure (GWNI) elements, the network data including data based on traffic that does not leave the GWNI element, at least one the GWNI elements being a Radio Access Network (RAN) node.

29. The communication system of claim 28 wherein the plurality of DAM entities interfaces with the GWNI element and the data analytics information includes an aggregation of data provided by the plurality of DAM network functions.

\* \* \* \* \*